United States Patent Office

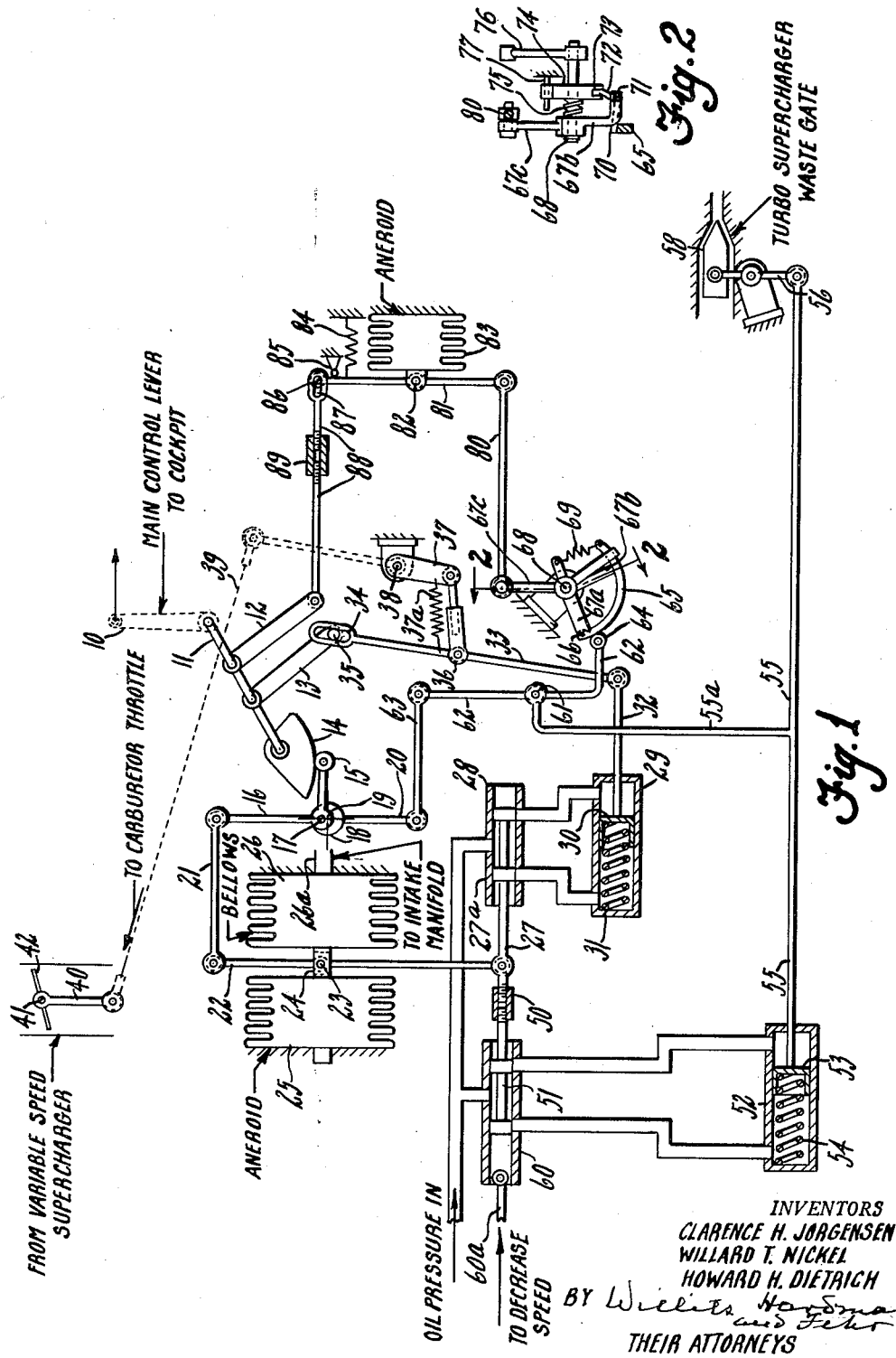

2,710,522
Patented June 14, 1955

2,710,522

ENGINE CONTROLLER

Clarence H. Jorgensen, East Rochester, and Willard T. Nickel and Howard H. Dietrich, Rochester, N. Y., assignors to General Motors Corporation, Detroit, Mich., a corporation of Delaware Application March 23, 1951, Serial No. 217,148

10 Claims. (Cl. 60—13)

This invention relates to the control of engine intake pressure in an internal combustion engine, particularly of the type generally used in aircraft, having a variable speed supercharger such as one which can be driven by an exhaust gas turbine or by the engine, through the medium of a hydraulic coupling.

It is an object of the present device to provide a control apparatus for an engine of the type referred to which is effective to variably control and automatically maintain the pressure in the engine intake by variably restricting the engine intake only while the supercharger is running at its minimum or idle speed, up to a certain predetermined maximum pressure, and to variably control the intake pressures maintained, above said predetermined maximum, solely by variations in speed of the supercharger.

In accordance with the present invention, this object is accomplished by the provision of apparatus for selecting pressures to be maintained and for automatically maintaining such pressures, that includes a pressure selecting member which is movable to different positions to select different pressures to be maintained, and which is effective during a part of its movement to control means for variably positioning the throttle valve for maintaining pressures up to the ambient pressure, which is approximately 30 inches of mercury at sea level, and which is effective during the balance of its movement to select pressures above the ambient pressure and to maintain the pressures selected by variably controlling the supercharger speed.

Another feature of the invention resides in the provision of a single pressure responsive device which operates to automatically control the intake pressure by variably controlling the throttle position and by variably controlling the supercharger speed.

A further feature of the invention resides in the provision of means for effecting what is known in the art as a pressure "droop," that is, means effective when pressures higher than the ambient pressure are selected, to move a valve which controls supercharger speed to its neutral or equilibrium position before the speed of the supercharger is quite sufficient to obtain an intake pressure exactly equal to that selected, for the purpose of preventing hunting and stabilizing the operation of the device. In order to obtain a pressure exactly equal to that selected by the selector member means are provided to add to the pressure selected by the selector member an increment equal to the amount of pressure droop so that the pressure actually selected exceeds that selected by the selector member by an amount equal to the reduction in pressure which is effected by the droop, whereby the one offsets or balances the other and the pressure which is obtained is exactly equal to that selected by the selector member.

The degree of pressure droop required to effect stability of operation varies with altitude and, therefore, an additional feature of the invention resides in the provision of means responsive to altitude for varying the increment of pressure, added to that selected by the positioning of the pressure selecting member, in accordance with the variation in pressure droop so that the excess of pressure actually selected over that selected by the pressure selecting member will exactly balance the pressure droop at different altitudes.

A further feature of the invention resides in the provision of means for manually adjusting the amount of pressure selected in excess of that selected by the selector member, independently of altitude, so as to effect an exact balance between the excess of selected pressure and the pressure droop.

An additional feature of the invention resides in the provision of means for manually adjusting the effect of the means responsive to altitude in controlling the excess in pressure selected over that selected by movement of the pressure selecting member.

Another feature of the invention resides in the provision of a plurality of servomotors one for variably positioning the throttle to variably control the intake pressures maintained up to the ambient pressure and another for operating the member which controls the speed of the supercharger to variably control pressures in excess of the ambient pressure, and a common means for operating the control valves for said servomotors which is so arranged that it is ineffective to cause operation of the control valve of the second servomotor until the throttle valve has been opened to its fullest extent by the first servomotor and means whereby the selector member actuates said valve operating means.

Further objects and advantages of the present invention will be apparent from the following description, reference being had to the accompanying drawing wherein a preferred embodiment of the present invention is clearly shown.

In the drawing:

Fig. 1 is a diagrammatic view of an engine control apparatus embodying the features of the present invention.

Fig. 2 is a detail section on the line 2—2 of Fig. 1.

Referring to Fig. 1, a manually operated lever 10, which is connected by means, not shown, to a lever in the pilot's cockpit, operates shaft 11, which is rotatably supported in any suitable way and to which are secured levers 12 and 13 and a pressure selecting cam 14 which engages and moves a roller 15 on a bell-crank lever 16 pivoted on a crank pin 17 extending from a lever hub 18 rotatably mounted in any suitable way on axis 19, the roller 15 being maintained in engagement with cam 14 by a spring, not shown. Also extending from the hub 18 is a lever 20, the purpose of which will be described later.

Lever 16 is connected by link 21 with lever 22 pivoted at 23 on bridge 24 connecting aneroid 25 with a bellows 26 which is connected by a pipe 26a with the engine intake so that the pressure maintained in said intake is communicated to the bellows. The left end of the aneroid and the right end of bellows 26 are fixed so that pressure variations in the engine intake cause movement of the pivot 23. Since the two bellows are of the same size variations in atmospheric pressure do not effect any movement of such pivot. Lever 22 is connected with a link 27 which is connected to a valve 27a movable in a guide 28 for controlling distribution of pressure fluid to a servo cylinder 29 containing a piston 30 which a spring 31 urges toward the right. The piston 30 is connected by rod 32 with lever 33 having a cam slot 34 receiving a pin 35 carried by lever 13. The lever 33 is connected at a point intermediate its ends with an extendable link 36 which connects with lever 37 pivoted at 38 and an extension of lever 37 is pivotally connected with link 39 which is pivotally connected with an operating arm 40 secured to shaft 41 carrying throttle valve 42.

A spring 37a has one end connected with link 33 and the other end connected with lever 37. This spring normally holds the parts in the position shown, but under some circumstances expands to permit link 33 to move toward the left while arm 37 remains stationary, as will be more fully explained later.

The mechanism so far described is effective to select various intake pressures to be maintained and to automatically maintain such pressures, if less than the ambient pressure, by variably positioning the throttle valve. To accomplish this, the cam 14 is moved by the control lever to select some desired pressure and to move the throttle to some extent. The movement of the cam effects movement of the control valve 27 which causes movement of piston 30 sufficiently to move throttle 42 to the proper position to obtain the pressure selected. When the throttle reaches this position, the valve 27 is restored to its position by action of bellows 26 and movement of piston 30 is stopped. If the pressure changes upon a change in altitude, the bellows 26 expands or contracts operating the control valve 27 in the proper direction to cause movement of piston 30 to close or open the throttle enough to restore the pressure to that selected.

In order to maintain pressures above the ambient pressure, if such pressures are selected, the control valve 27 is connected by a turnbuckle 50 with a valve 51 for controlling distribution of pressure fluid to a servo cylinder 52 containing a piston 53 which a spring 54 urges toward the right. A rod 55 connects the piston 53 with lever 56 pivoted on a suitable fixed pivot and connected at its other end with the waste gate 58 of an exhaust gas turbine which drives a supercharger. This turbine driven supercharger is the sole means for boosting manifold pressure in this device. However, the construction of the supercharger and driving means forms no part of this invention. Any suitable turbine driven supercharger can be used or an engine driven supercharger operating at variable speeds such as a supercharger driven through a hydraulic coupling. Therefore, no specific form of supercharger is illustrated herein. The valve 51 slides in a guide sleeve 60 which is connected to a link 60a and this link may be operated by any suitable speed controlled means, for the purpose of limiting the turbine speed to a safe maximum value.

A rod 55a extending from the rod 55 carries a fulcrum 61 on which is pivoted lever 62 connected by link 63 with lever 20, which, as previously stated, projects from the hub 18. This lever 62 carries a roller 64 which engages a cam 65 pivoted at 66 on a lever arm 67a pivoted loosely on a shaft 68, which is rotatably mounted in any suitable fixed supporting means. A spring 69 urges cam 65 counterclockwise about its pivot 66 into engagement with a stop lever 70 pivoted at 71 on a lever arm 67b integral with arm 67a, as shown in Fig. 2. Lever 70 has a lug 72 received by a groove 73 in a nut 74 threaded on screw 75 provided by shaft 68. A manually operated lever 76, which is connected to suitable operating connections (not shown) extending to the pilot's cockpit, turns shaft 68 and the rotation of this shaft moves the nut 74 on said shaft axially, rotation being prevented by a rod 77 extending through a notch or hole in the nut. Thus the pilot, through the operating connections referred to, can adjust the position of the lever arm 76 and in this way can determine the location of cam 65 relative to lever 67a.

A lever 67c is integral with lever 67a and is connected by a link 80 with a lever 81 pivotally connected at 82 with the free end of aneroid bellows 83, the other end of which is suitably supported on some fixed part of the device. A spring 84 urges lever 81 clockwise against a fixed stop 85. The lever 81 carries a pin 86 which is received in a slot 87 formed in a link 88, the length of which is adjustable by a turnbuckle 89. This link 88 connects lever 81 with the lever arm 12 secured to the shaft 11 and transmits movement of such shaft to the cam 65.

For operation of the plane at low altitude or taxiing, the apparatus will control for pressures up to the ambient pressure (approximately 30" Hg absolute at sea level) while the waste gate 58 remains fully open and the turbine runs just fast enough to keep supercharger outlet pressure up to the ambient pressure. The turnbuckle 50 is adjusted so that, during control of pressure up to the ambient pressure valve 51 admits no pressure fluid to the right end of cylinder 52. Therefore spring 54 operates to hold the waste gate 58 open to the fullest extent. When cam 14 is moved to a position demanding a manifold, or engine intake pressure equal to the ambient pressure, the piston 30 moves left as far as it can go to move throttle valve 42 wide open. Therefore, a manifold pressure in excess of the ambient pressure cannot be obtained unless the supercharger speed increases above its minimum or idle speed. Since the throttle is already fully open when the ambient pressure is obtained, no higher pressure can be obtained by further movement of the throttle and in order to get a higher pressure the supercharger must be operated at greater speed.

The cam 14 is designed to select manifold pressure up to a certain maximum, for example 60" Hg abs. If a pressure in excess of ambient pressure is selected, after throttle valve 42 has been opened wide, so that the highest possible pressure obtainable by operation of the supercharger at its minimum or idle speed is maintained in the intake without supercharging, the valve 51 moves far enough to the right to admit pressure fluid to the right end of cylinder 52 and rod 55 moves left to move the waste gate 58 toward closed position. As soon as the waste gate starts moving toward closed position, the turbine speed begins increasing above the idle speed and the pressure which is created by the supercharger in the engine intake increases. As this pressure increases, the bellows 26 expands to cause valve 51 to move to the left and such valve eventually moves into equilibrium position. The valve 51 reaches its equilibrium position when the pressure obtained is slightly below the selected pressure. This action is effected for the sake of stability of operation and is brought about by operation of the parts 61—64 which operate in the following manner.

The roller 64, being maintained in engagement with cam 65 by a spring, not shown, as rod 55 moves left to close the waste gate 58, the integral extension 55a of such rod and pivot 61 also move left so that lever 62 rotates counterclockwise about the point of contact of roller 64, with arm 65 as a pivot, thereby causing lever 20 and its hub 18 to rotate clockwise on the axis 19. Since the crank pin 17 is eccentrically mounted on the hub 18, this movement of the hub causes lever 16 and link 21 to move slightly to the right, which effects movement of valve 51 to the left with the result that the valve reaches its equilibrium position and flow of pressure fluid is cut off when the manifold pressure is slightly less than the selected pressure.

As already stated, the function of obtaining a pressure automatically which is not quite equal to that selected by the cam 14, or, in other words, the introduction of what is termed a pressure "droop" is brought about for the purpose of effecting stability of operation, the introduction of the droop being effective to eliminate "hunting" and to cause the action to be stable when there is an increase in pressure demand. Unless the pressure "droop" is to be permanent, that is, if the exact pressure demanded by the selecting member 14 is to be obtained, it is necessary to effect the operation of pressure selection in such a way that an increment of pressure is added to that which is selected by the cam 14, that is equal to the difference between the pressure selected by the cam and that which is actually obtained as a result of the action of the above described "droop" mechanism. In other words, the pressure which is actually selected is greater than that which is selected by cam 14, by an amount which is equal to the reduction in pressure obtained which is brought about by the droop mechanism.

In Fig. 1, the control lever 10 and the datum cam 14 are in position for demanding 30" Hg manifold pressure, which is substantially that which can be obtained at sea level without boost by the supercharger. The lost motion between link 88 and lever 81 has been taken up since the right end of slot 87 engages pin 86. If a pressure exceeding 30" Hg at sea level, or in excess of the ambient pressure, at any altitude, is selected, levers 67a—b—c are moved clockwise and cam 65 pushes roller 64 further from shaft 68. This causes the lever 62 to rotate clockwise which, in turn, causes lever 20 to rotate counterclockwise, moving the crank pin 17 counterclockwise about axis 19 so that lever 16 moves in a direction to add an increment to the pressure selection as effected by the position of cam 14. The greater the movement of the pressure selecting lever 10 in a direction to select higher pressures, the greater will be the increment of pressure added by the above described mechanism to that selected by the position of cam 14. This is consistent with the fact that, as the pressure selection or demand increases, the greater must be the movement of the waste gate in the closing direction to obtain such pressure and, hence, the greater the movement of rod 55 and pivot 61, and the greater must be the droop brought about by the movement of such parts in order to effect stability of operation. If the altitude remains the same, the required pressure droop to maintain stability of operation increases about in proportion to the amount of increase in the pressure selected by cam 14 and the increment added to such selected pressure, by the mechanism described, in order to offset the droop, increases in amount about in proportion to the amount of increase in pressure selected by cam 14.

It will be understood from the foregoing that if the mechanism above described, which is effective to actually select a slightly higher pressure than that selected by cam 14, was not provided, the effect of the droop mechanism would be permanent and the pressure which is obtained upon any increase in pressure selection would be less than that selected by the movement of cam 14, by an amount equal to the pressure reduction effected by the droop mechanism. With the device disclosed the droop mechanism is effective to bring about stability of operation and at the same time the exact pressure called for by the positioning of cam 14 is actually obtained.

As altitude increases, the exhaust back pressure decreases. Therefore, less waste gate movement is required to control the speed of the supercharger and less pressure droop is required to effect stability of operation. In order to modify the extent of pressure droop upon variation in altitude there is provided an aneroid 83 which expands as altitude increases to effect counterclockwise movement of cam 65 relative to shaft 68. This has the effect of reducing the actual increase in the pressure which is selected by any movement of lever 10 to increase the selected pressure. Obviously the pressure which is actually selected by a movement of the lever 10 to increase the selected pressure is that selected by the movement of cam 14 plus the increment which is added by the clockwise movement of cam 65, as previously described, and if the clockwise movement of cam 65 is reduced, the pressure actually selected is reduced. Since the aneroid 83, upon an increase in altitude, will effect a counterclockwise movement of cam 65, the net clockwise movement of such cam at high altitudes will be less than at lower altitudes and the increment of pressure added by movement of cam 65 to that selected by action of cam 14 upon a movement of lever 10 will be less at high altitudes than at lower altitudes. This reduction in the pressure actually selected by a movement of lever 10 to increase the pressure at high altitudes corresponds to the reduction in the pressure droop which is required to effect stability. Therefore, the reduction in pressure droop at high altitudes is balanced by an equal reduction in pressure actually selected over that selected by movement of cam 14, so that the intake pressure which is actually obtained is that which is selected by movement of cam 14 at any altitude and the pressure droop, although effective to stabilize operation, does not cause a pressure different from that selected by movement of cam 14 to be obtained at any altitude.

As already stated, the effect of cam 65 can be somewhat modified by operation of lever 76 which will effect a slight movement of the cam on its pivot 66. In this way the position of the cam can be very accurately adjusted and its action accurately controlled. Similarly, the effect of the aneroid 83 can be very accurately controlled by adjustment of turnbuckle 89. These adjustments are particularly useful in synchronizing the operation when a plurality of engines are each equipped with an apparatus such as described.

When the throttle is fully opened so as to obtain a manifold pressure equal to the ambient pressure, the lever 37 cannot move further in a clockwise direction. Therefore, in order to permit movement of cam 14 to a position to select pressures higher than the ambient pressure, some means must be provided which will allow the upper end of lever 33 to move to the left while lever 37 remains stationary, because in moving the cam 14 to select higher pressures, the arm 13 will be moved clockwise and the upper end of lever 33 will be moved to the left. To permit this movement, the expandable link 36 and spring 37a are provided. Normally the spring will hold the parts in the position shown in the drawing, but if higher pressures are selected after the throttle is wide open, the spring will yield, allowing the upper end of lever 33 to move toward the left without moving lever 37 at all.

While the embodiment of the present invention as herein disclosed, constitutes a preferred form, it is to be understood that other forms might be adopted.

What is claimed is as follows:

1. Apparatus for variably controlling the intake pressure of a supercharged internal combustion aircraft engine having, in combination, an engine intake which is adapted to be supplied with air under pressure by a variable speed supercharger, a throttle valve in said intake, a selector member movable to different positions to select different pressures to be maintained in the engine intake, means for obtaining the pressure selected including a means operated by the selector member for controlling supercharger speed, means operative, when the selector member is moved to select a higher pressure, to prevent the supercharger speed from being increased sufficiently to obtain the exact speed selected by said selector member, and means operable, when pressures above a predetermined pressure are selected, to add an increment to the pressure selected by said selector member equal to the difference between the pressure selected by said member and the pressure which would be obtained by the supercharger as determined by the selector, so that the exact pressure selected by the selector member is that which is obtained by increasing the supercharger speed.

2. Apparatus for variably controlling the intake pressure of a supercharged internal combustion aircraft engine having, in combination, an engine intake which is adapted to be supplied with air under pressure by a variable speed supercharger, a throttle valve in said intake, means for obtaining different selected pressures in the engine intake including means for increasing the supercharger speed, means for preventing a sufficient increase in the speed of the supercharger to obtain the exact pressure selected, and means for selecting a pressure higher than that desired by an amount equal to the difference between the pressure selected and that obtained whereby the pressure obtained is exactly equal to the pressure desired.

3. Apparatus for variably controlling the intake pressure of a supercharged internal combustion aircraft engine having, in combination, an engine intake which is adapted to be supplied with air under pressure by a variable speed supercharger, a throttle valve in said intake, means for obtaining different selected pressures in the engine intake including means for increasing the supercharger speed, means for preventing a sufficient increase in the speed of the supercharger to obtain the exact pressure selected, means for selecting a pressure higher than that desired by an amount equal to the difference between the pressure selected and that obtained whereby the obtained pressure is exactly equal to the pressure desired, said last named means including a selecting member movable to a position to select a desired pressure, means operated thereby for causing the supercharger speed to be modified sufficiently to obtain a pressure approaching that selected by said member and a second member operable simultaneously with said selector member to add an increment to the pressure selected thereby, said second member being effective to control the operation of the means for controlling the supercharger speed so as to cause the supercharger to operate at a speed sufficient to obtain the pressure selected by said first named member.

4. Apparatus for variably controlling the intake pressure of a supercharged internal combustion aircraft engine having, in combination, an engine intake which is adapted to be supplied with air under pressure by a variable speed supercharger, a throttle valve in said intake, means for obtaining different selected pressures in the engine intake including means for increasing the supercharger speed, means for preventing a sufficient increase in the speed of the supercharger to obtain the exact pressure selected, means for selecting a pressure higher than that desired by an amount equal to the difference between the pressure selected and that obtained whereby the obtained pressure is exactly equal to the pressure desired, said means including a selector member movable to a position to select a desired pressure, means operated thereby for causing the supercharger speed to be modified sufficiently to obtain a pressure approaching that selected by said member, a second member operable simultaneously with said selector member to add an increment to the pressure selected thereby, said second member being effective to control the operation of the means for controlling the supercharger speed so as to cause the supercharger to operate at a speed sufficient to obtain the pressure selected by said first named member, and manually operated means for varying the effect of said second member.

5. Apparatus for variably controlling the intake pressure of a supercharged internal combustion aircraft engine having, in combination, an engine intake which is adapted to be supplied with air under pressure by a variable speed supercharger, a throttle valve in said intake, means for obtaining different selected pressures in the engine intake including means for increasing the supercharger speed, means for preventing a sufficient increase in the speed of the supercharger to obtain the exact pressure selected, means for selecting a pressure higher than that desired by an amount equal to the difference between the pressure selected and that obtained whereby the obtained pressure is exactly equal to the pressure desired, said means including a selector member movable to a position to select a desired pressure, means operated thereby for causing the supercharger speed to be modified sufficiently to obtain a pressure approaching that selected by said member, a second member operable simultaneously with said selector member to add an increment to the pressure selected thereby, said second member being effective to control the operation of the means for controlling the supercharger speed so as to cause the supercharger to operate at a speed sufficient to obtain the pressure selected by said first named member and means operable automatically for varying the effect of the second member in its control of the supercharger speed in accordance with variations in the pressure which is selected by said selector member.

6. Apparatus for variably controlling the intake pressure of a supercharged internal combustion aircraft engine having, in combination, an engine intake which is adapted to be supplied with air under pressure by a variable speed supercharger, a throttle valve in said intake, means for obtaining different selected pressures in the engine intake including means for increasing the supercharger speed, means for preventing a sufficient increase in the speed of the supercharger to obtain the exact pressure selected, means for selecting a pressure higher than that desired by an amount equal to the difference between the pressure selected and that obtained whereby the obtained pressure is exactly equal to the pressure desired, said means including a selector member movable to a position to select a desired pressure, means operated thereby for causing the supercharger speed to be modified sufficiently to obtain a pressure approaching that selected by said member, a second member operable simultaneously with said selector member to add an increment to the pressure selected thereby, said second member being effective to control the operation of the means for controlling the supercharger speed so as to cause the supercharger to operate at a speed sufficient to obtain the pressure selected by said first named member and means responsive to variations in altitude pressure for automatically varying the effect of the second member in its control of the supercharger speed, whereby the increase in supercharger speed effected by operation of said second member is varied in accordance with the altitude.

7. Apparatus for variably controlling the intake pressure of a supercharged internal combustion aircraft engine having, in combination, an engine intake which is adapted to be supplied with air under pressure by a variable speed supercharger, a throttle valve in said intake, means for obtaining different selected pressures in the engine intake including means for increasing the supercharger speed, means for preventing a sufficient increase in the speed of the supercharger to obtain the exact pressure selected, means for selecting a pressure higher than that desired by an amount equal to the difference between the pressure selected and that obtained whereby the obtained pressure is exactly equal to the pressure desired, said means including a selector member movable to a position to select a desired pressure, means operated thereby for causing the supercharger speed to be modified sufficiently to obtain a pressure approaching that selected by said member, a second member operable simultaneously with said selector member to add an increment to the pressure selected thereby, said second member being effective to control the operation of the means for controlling the supercharger speed so as to cause the supercharger to operate at a speed sufficient to obtain the pressure selected by said first named member, means responsive to variations in altitude pressure for automatically varying the effect of the second member in its control of the supercharger speed, whereby the increase in supercharger speed effected by operation of said second member is varied in accordance with the altitude, and means for adjusting the effect of the altitude pressure responsive means.

8. Apparatus for variably controlling the intake pressure of a supercharged internal combustion aircraft engine having, in combination, an engine intake which is adapted to be supplied with air under pressure by a variable speed supercharger, a throttle valve in said intake, means for obtaining different selected pressures in the engine intake including means for increasing the supercharger speed, means for preventing a sufficient increase in the speed of the supercharger to obtain the exact pressure selected, means for selecting a pressure higher than that desired by an amount equal to the difference between the pressure selected and that obtained whereby the obtained pressure is exactly equal to the pressure desired, said means including a selected member movable to a position to select a desired pressure, means operated thereby for causing the supercharger speed to be modified sufficiently to obtain a pressure approaching that selected by said member and which is progressively less than that required to obtain the selected pressure as the latter is progressively increased, a second member operable simultaneously with said selector member to add a progressively increasing increment to the pressure selected thereby as the pressure selected by said selector member is progressively increased, said second member being effective to control the operation of the means for controlling the supercharger speed so as to cause the supercharger to operate at a speed sufficient to obtain the pressure selected by said first named member as the latter is moved to select increasingly higher pressures.

9. Apparatus for variably controlling the intake pressure of a supercharged internal combustion aircraft engine having, in combination, an engine intake which is adapted to be supplied with air under pressure by a variable speed supercharger, a throttle valve in said intake, means for obtaining different selected pressures in the engine intake including means for increasing the supercharger speed, means for preventing a sufficient increase in the speed of the supercharger to obtain the exact pressure selected, means for selecting a pressure higher than that desired by an amount equal to the difference between the pressure selected and that obtained whereby the obtained pressure is exactly equal to the pressure desired, said means including a selector cam movable to a position to select a desired pressure, means for controlling the speed of the supercharger, a servo motor for operating said control means, a member for controlling the operation of the servomotor, means engaging said cam and operable thereby to actuate the control member for the servo motor and cause an increase in supercharger speed sufficient to obtain a pressure approaching that selected by the selector cam, a second cam, means engaging said second cam and operatively connected with the means engaging the selector whereby movements of the second cam also actuate the control member for the servomotor to bring about operation of the supercharger at a higher speed than that effected by actuation of the selector cam, so that the supercharger is caused to operate at a speed sufficient to obtain the pressure called for by the selector cam.

10. Apparatus for variably controlling the intake pressure of a supercharged internal combustion aircraft engine having, in combination, an engine intake which is adapted to be supplied with air under pressure by a variable speed supercharger, a throttle valve in said intake, means for obtaining different selected pressures in the engine intake including means for increasing the supercharger speed, means for preventing a sufficient increase in the speed of the supercharger to obtain the exact pressure selected, means for selecting a pressure higher than that desired by an amount equal to the difference between the pressure selected and that obtained whereby the obtained pressure is exactly equal to the pressure desired, said means including a selector cam movable to a position to select a desired pressure, means for controlling the speed of the supercharger, a servomotor for operating said control means, a member for controlling the operation of the servomotor, means engaging said cam and operable thereby to actuate the control member for the servomotor and cause an increase in supercharger speed sufficient to obtain a pressure approaching that selected by the selector cam, a second cam, means engaging said second cam and operatively connected with the means engaging the selector whereby movements of the second cam also actuate the control member for the servomotor to bring about operation of the supercharger at a higher speed that that effected by actuation of the selector cam, so that the supercharger is caused to operate at a speed sufficient to obtain the pressure called for by the selector cam and means for changing the contour of said second cam so as to modify its effect on the supercharger speed.

References Cited in the file of this patent

UNITED STATES PATENTS

| | | |
|---|---|---|
| 2,373,139 | Morris | Apr. 10, 1945 |
| 2,405,309 | Jorgensen et al. | Aug. 6, 1946 |
| 2,480,758 | Mock et al. | Aug. 30, 1949 |
| 2,562,742 | Rowe et al. | July 31, 1951 |